United States Patent
Armstrong et al.

(10) Patent No.: US 9,137,208 B2
(45) Date of Patent: *Sep. 15, 2015

(54) DIRECTORY SERVER FOR AUTOMATIC NETWORK INFORMATION ACCESS SYSTEMS

(71) Applicant: ELECTRONICS FOR IMAGING, INC., Fremont, CA (US)

(72) Inventors: John Armstrong, Half Moon Bay, CA (US); Ofer Tenenbaum, San Jose, CA (US); Victor Thu, Santa Clara, CA (US)

(73) Assignee: Electronics for Imaging, Inc., Fremont, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/081,874

(22) Filed: Nov. 15, 2013

(65) Prior Publication Data

US 2014/0075534 A1 Mar. 13, 2014

Related U.S. Application Data

(63) Continuation of application No. 13/526,338, filed on Jun. 18, 2012, now Pat. No. 8,595,384, which is a continuation of application No. 10/808,743, filed on Mar. 24, 2004, now Pat. No. 8,205,012.

(51) Int. Cl.
*H04L 9/32* (2006.01)
*G06F 15/16* (2006.01)
(Continued)

(52) U.S. Cl.
CPC ...... *H04L 63/0236* (2013.01); *H04L 29/12113* (2013.01); *H04L 61/1541* (2013.01); *H04L 67/16* (2013.01); *H04L 67/18* (2013.01); *H04W 4/02* (2013.01)

(58) Field of Classification Search
CPC ............... H04L 29/08108; H04L 29/08144; H04L 29/08567; H04L 63/0236; H04L 29/12113; H04L 61/1541; H04L 67/16; H04L 67/18; G06F 21/604; G06F 21/606; G06F 21/608; G06F 21/62; H04W 4/02

USPC .......... 726/2–4, 11–12, 27–30; 709/203, 223, 709/225, 229, 249, 250

See application file for complete search history.

(56) References Cited

U.S. PATENT DOCUMENTS 5,852,744 A 12/1998 Agatone et al.
6,212,558 B1 * 4/2001 Antur et al. ................... 709/221
(Continued)

FOREIGN PATENT DOCUMENTS

EP 0817444 A2 1/1998
EP 1263171 A1 12/2002
(Continued)

OTHER PUBLICATIONS

"Dynamic Printer Selection System Using DNS Service", Research Discolosure, No. 449, Sep. 1, 2001, p. 1549.
(Continued)

*Primary Examiner* — Hosuk Song
(74) *Attorney, Agent, or Firm* — Michael A. Glenn; Perkins Coie LLP

(57) ABSTRACT

Systems, apparatus and methods are described for providing information access to network devices. A directory server registers identification information about a first network device coupled to a first network. The first network and the directory server may be coupled to a second network, which may include a wide area network, public network, or the Internet. The identification information may include a network address of the first network device on the first network, or a network address of the first network on the second network. The directory server may receive and process requests for identification information about registered network devices, and may selectively reply to the requests based on status information of the first network device.

12 Claims, 12 Drawing Sheets

(51) Int. Cl.
*H04L 29/06* (2006.01)
*H04L 29/12* (2006.01)
*H04W 4/02* (2009.01)
*H04L 29/08* (2006.01)

(56) References Cited

U.S. PATENT DOCUMENTS

| | | | |
|---|---|---|---|
| 6,496,859 | B2 | 12/2002 | Roy et al. |
| 6,523,696 | B1 * | 2/2003 | Saito et al. ............... 709/223 |
| 6,574,664 | B1 | 6/2003 | Liu et al. |
| 6,640,253 | B2 | 10/2003 | Schaefer |
| 6,754,181 | B1 | 6/2004 | Elliott et al. |
| 6,816,898 | B1 * | 11/2004 | Scarpelli et al. ........... 709/224 |
| 6,859,832 | B1 | 2/2005 | Gecht et al. |
| 7,149,698 | B2 | 12/2006 | Guheen et al. |
| 7,293,077 | B1 | 11/2007 | Teo et al. |
| 7,583,396 | B2 | 9/2009 | Okazawa |
| 8,205,012 | B2 * | 6/2012 | Armstrong et al. ......... 709/249 |
| 8,595,384 | B2 * | 11/2013 | Armstrong et al. ......... 709/249 |
| 2001/0029534 | A1 | 10/2001 | Spinks et al. |
| 2002/0083431 | A1 | 6/2002 | Machida |
| 2002/0133555 | A1 | 9/2002 | Hall et al. |
| 2002/0162028 | A1 | 10/2002 | Kennedy |
| 2002/0191210 | A1 | 12/2002 | Staas et al. |
| 2002/0191211 | A1 | 12/2002 | Miller et al. |
| 2003/0067624 | A1 | 4/2003 | Anderson et al. |
| 2004/0003058 | A1 | 1/2004 | Trossen |
| 2004/0107125 | A1 | 6/2004 | Guheen et al. |

FOREIGN PATENT DOCUMENTS

| | | |
|---|---|---|
| EP | 05724422.0 | 7/2007 |
| WO | WO-2005006877 | 5/2005 |

OTHER PUBLICATIONS

"Rendezvous: New Standard Networking Technology that Connects Computers and Electronic Devices Automatically, Without any Configuration", Technology Brief, Mac OS X: Renezvous, 2003 Apple Computer, Inc. retrieved online on Mar. 24, 2004 from url: http://a144.g.akamai.net/7/144/51/c85db1658520b0/www.apple.com/macosx/pdf/Panther_Rendezvous_TB_10232003.pdf.

Bettstetter, et al., "A Comparison of Service discoery Protocols and Implementation of the Service Location Protocol", XP 002279616, Sep. 13, 2000.

Gutman, et al., "Service Location Protocol, Ver. 2", The Internet Society, XP002191158, Jun. 1999.

Guttman, , "Autoconfiguration for IP Networking: Enabling Local Communication", IEEE Internet computing, May/Jun. 2011, pp. 81-86.

Zhao, , "The SLP Service and Remote Discovery in SLP", Internet Engineering Tack Force, XP015005910, Sep. 25, 2002.

Zhu, et al., "Classification of Service Discovery in Pervasive Computing Enviornments", XP002328060, 2002.

* cited by examiner

| SOURCE ADDRESS | DEVICE TYPE | DEVICE NAME |
|---|---|---|
| 67.113.234.12 | PRINTER | SNOOPY |
| 82.24.117.8 | CLIENT | HILLARY |
| 117.33.2.45 | CLIENT | JOE |
| 117.33.2.45 | PRINTER | LINUS |
| 117.33.2.45 | PRINTER | LUCY |
| 67.113.234.12 | CLIENT | BILL |
| 67.113.234.12 | IP PHONE | AL's PHONE |
| ⋮ | ⋮ | ⋮ |

| SOURCE ADDRESS | INTERNAL ADDRESS | DEVICE TYPE | DEVICE NAME |
|---|---|---|---|
| 67.113.234.12 | 192.168.1.101 | PRINTER | SNOOPY |
| 82.24.117.8 | - | CLIENT | HILLARY |
| 117.33.2.45 | 208.210.1.47 | CLIENT | JOE |
| 117.33.2.45 | 208.210.1.5 | PRINTER | LINUS |
| 117.33.2.45 | 208.210.1.69 | PRINTER | LUCY |
| 67.113.234.12 | 192.168.1.100 | CLIENT | BILL |
| 67.113.234.12 | 192.168.1.102 | IP PHONE | AL's PHONE |
| ⋮ | ⋮ | ⋮ | ⋮ |

*FIG. 4B*

| SOURCE ADDRESS | EQUIVALENT SOURCE ADDRESS 1 | EQUIVALENT SOURCE ADDRESS 2 | EQUIVALENT SOURCE ADDRESS 3 | EQUIVALENT SOURCE ADDRESS 4 | ... |
|---|---|---|---|---|---|
| 67.113.234.12 | 67.113.234.13 | 67.113.234.14 | 67.113.234.15 | 67.113.234.16 | ... |
| 117.33.2.45 | 4.3.116.157 | 17.1.100.65 | — | — | — |
| ... | ... | ... | ... | ... | ... |

*FIG. 5*

| SOURCE ADDRESS | INTERNAL ADDRESS | DEVICE TYPE | DEVICE NAME |
|---|---|---|---|
| 67.113.234.12 | 192.168.1.101 | PRINTER | SNOOPY |
| 82.24.117.8 | - | CLIENT | HILLARY |
| 117.33.2.45 | 208.210.1.47 | CLIENT | JOE |
| 4.3.116.57 | 208.210.1.5 | PRINTER | LINUS |
| 17.1.100.65 | 208.210.1.69 | PRINTER | LUCY |
| 67.113.234.13 | 192.168.1.100 | CLIENT | BILL |
| 67.113.234.14 | 192.168.1.102 | IP PHONE | AL's PHONE |
| ⋮ | ⋮ | ⋮ | ⋮ |

FIG. 6

| SOURCE ADDRESS | EQUIVALENT SOURCE ADDRESS 1 | EQUIVALENT SOURCE ADDRESS 2 | EQUIVALENT SOURCE ADDRESS 3 | EQUIVALENT SOURCE ADDRESS 4 | EQUIVALENT SOURCE ADDRESS 5 | EQUIVALENT SOURCE ADDRESS 6 | EQUIVALENT SOURCE ADDRESS 7 |
|---|---|---|---|---|---|---|---|
| 67.113.234.12 | 67.113.234.13 | 67.113.234.14 | 67.113.234.15 | 67.113.234.16 | 117.33.2.45 | 4.3.116.157 | 17.1.100.65 |
| 82.24.117.8 | 117.33.2.45 | 4.3.116.157 | 17.1.100.65 | — | — | — | — |
| ... | ... | ... | ... | ... | ... | ... | ... |

| SOURCE ADDRESS | INTERNAL ADDRESS | DEVICE TYPE | DEVICE NAME | ACCESS RIGHTS | CHARACTERISTICS |
|---|---|---|---|---|---|
| 67.113.234.12 | 192.168.1.101 | PRINTER | SNOOPY | PASSWORD REQUIRED | HIGH SPEED B&W |
| 82.24.117.8 | 10.10.99.32 | CLIENT | HILLARY | PRINTERS: ALL IP PHONES: NONE | DESKTOP |
| 117.33.2.45 | 208.210.1.47 | CLIENT | JOE | PRINTERS: ALL B&W IP PHONES: NONE | PDA |
| 4.3.116.57 | 208.210.1.5 | PRINTER | LINUS | – | LOW SPEED B&W |
| 17.1.100.65 | 208.210.1.69 | PRINTER | LUCY | PREFERRED MEMBERS ONLY | COLOR |
| 67.113.234.13 | 192.168.1.100 | CLIENT | BILL | PRINTERS: LOW SPEED B&W IP PHONES: ALL | WIRELESS LAPTOP |
| 67.113.234.14 | 192.168.1.102 | IP PHONE | AL's PHONE | PRINTERS: ALL COLOR IP PHONES: ALL | SECURE |
| ... | ... | ... | ... | ... | ... |

| SOURCE ADDRESS | INTERNAL ADDRESS | DEVICE TYPE | DEVICE NAME | LOCATION |
|---|---|---|---|---|
| 75.8.92.1 | 192.168.1.102 | IP PHONE | BOB | BUILDING A, 2nd FLOOR |
| 75.8.92.1 | 192.168.1.103 | IP PHONE | CAROL | BUILDING A, 3rd FLOOR |
| 117.33.2.45 | 208.210.1.63 | IP PHONE | TED | BUILDING A, CONFERENCE ROOM D |
| 19.4.79.65 | 115.48.1.2 | IP PHONE | ALICE | BUILDING B |
| 19.4.79.65 | 115.48.1.3 | IP PHONE | FRED | BUILDING B |
| 19.4.79.65 | 115.48.1.4 | IP PHONE | ETHEL | BUILDING B |
| 117.33.2.45 | 208.210.1.47 | CLIENT | JOE | BUILDING A, CUBICLE 1A238 |
| ... | ... | ... | ... | ... |

*FIG. 11*

| SOURCE ADDRESS | DEVICE NAME | DEVICE TYPE | INTERNAL ADDRESS/ PAGER NUMBER | LOCATION | SUPPORT STATUS/ RESTRICTIONS |
|---|---|---|---|---|---|
| 2.67.13.120 | GEORGE | PAGER | 415-555-1212 | SAN FRANCISCO | ANY CUSTOMER |
| 2.67.13.120 | MELISSA | PAGER | 415-555-1213 | SAN FRANCISCO | PREMIER CUSTOMERS |
| 2.67.13.120 | HENRY | PAGER | 212-555-1212 | NEW YORK | ANY CUSTOMER |
| 2.67.13.120 | ARTHUR | PAGER | 800-555-1212 | US | PRIORITY FEE SUPPORT |
| 45.39.1.200 | MATT | B&W PRINTER | 78.5.23.42 | NEW YORK | NO SUPPORT |
| 45.39.1.200 | MARK | COLOR PRINTER | 78.5.23.50 | DALLAS | PER USE FEE SUPPORT |
| 45.39.1.200 | LUKE | LOW SPEED B&W PRINTER | 78.5.23.119 | SAN FRANCISCO | SUPPORT-PREMIER |
| 45.39.1.200 | JOHN | MULTIFUNCTION DEVICE | 78.5.23.13 | SAN FRANCISCO | SUPPORT-REGULAR |

*FIG. 13*

DIRECTORY SERVER FOR AUTOMATIC NETWORK INFORMATION ACCESS SYSTEMS

REFERENCE TO RELATED APPLICATIONS

This application is a continuation of U.S. patent application Ser. No. 13/526,338, filed Jun. 18, 2012, which is a continuation of U.S. patent application Ser. No. 10/808,743, filed 24 Mar. 2004, now U.S. Pat. No. 8,205,012, the entirety of each of which is incorporated herein by this reference thereto.

BACKGROUND

In recent years, communications and computer equipment such as computers, personal digital assistants, pagers, cellular telephones, handheld messaging devices, facsimile machines, copiers and printers (collectively referred to herein as computer devices) have become increasingly affordable and abundant. As computer devices have become increasingly prevalent, technologies for connecting computer devices to other computer devices have also become more pervasive. For example, it is common today for office computers to be connected together in networks with other computers, printers, copiers, facsimile machines, data storage devices, Internet web servers, and other computer devices.

The trend toward increasingly interconnected networks of computer devices is expected to increase in size and scope. For example, more businesses and households are implementing wired and wireless computer networks for connecting multiple computers, printers, handheld messaging devices and other computer devices into computer networks. In addition, common household devices, such as refrigerators, laundry appliances, heaters, air conditioners, lighting systems, and home entertainment systems are being developed that include computer networking technology to add features and expanded control over such devices.

Computer networking offers numerous advantages to users and system administrators. For example, users may easily communicate with one another, exchange data, and share computer resources, such as Internet access, data storage devices and printers. System administrators benefit by being able to more efficiently utilize computer resources, and by being able to have greater access to and control over computer devices coupled to the network.

When a user of a computer device on a computer network wishes to communicate with another computer device on the network, the user typically must consult a list containing information about available devices. For example, if a user of a networked office computer wants to send a print job to a networked printer, the user typically must first browse a directory containing a list of available printers, select one of the printers by name, network address, or other form of network identification, install a printer driver for the selected printer on the user's computer, and then issue a print command to the selected printer. The information in the list of available devices is typically compiled by a network administrator, who often must manually maintain the list, and frequently may organize the computer devices into one or more groups depending on user demand and availability of resources. For example, as printers are added to and removed from a network, or to and from groups within the network, the network administrator typically must manually update the information in the printer list.

Such manual techniques for managing access to information about networked computer devices has become increasingly complex and burdensome as network devices have become more highly mobile, and wireless networking has become more abundant. For example, an Internet café or airport lounge may provide a WiFi hotspot for wireless network access by mobile computer devices, such as laptop computers that include a wireless network adapter. As the number of computer devices connected to a wireless network may continually change, the network administrator must continually monitor and revise lists of information about connected devices. Such continuous monitoring and modification consumes substantial time and resources.

To address problems associated with such manual techniques, some previously known techniques seek to provide automatic network configuration. For example, Rendezvous™ by Apple Computer, Inc., Cupertino, Calif., U.S.A., is a networking technology based on zero configuration network technology that automatically connects electronic devices on a network. In particular, Rendezvous allows devices on a secure network to communicate with one another and automatically find and configure resources. This technique, however, has several limitations. First, Rendezvous requires that devices continually communicate their availability, which consumes network bandwidth and makes the technique sensitive to network status. Second, Rendezvous only functions on a local network, and cannot be used to configure resources across wide area or public networks.

Indeed, as the number of computer networks has increased, the advantages of permitting communications between computer devices on different networks has also increased. For example, a first company may include its computers, printers and other networked computer devices on a first computer network. The first company may seek the services of a second company that may include its computers, printers and other networked computer devices on a second computer network. If the first and second networks each are connected to a public network, such as the Internet, computer devices of the first and second network potentially may communicate with one another via the Internet.

Although such internetwork communication may be desirable, currently available methods for managing access to information about internetworked computer devices have numerous disadvantages. In particular, existing methods for providing access to information about computer devices on disparate networks are not generalized across platforms or networks, and often require homogeneous network and client environments to properly function. Thus, in the previous example, if the first network uses the transmission control protocol/Internet protocol ("TCP/IP") communications protocol, and the second network uses the AppleTalk communications protocol, providing users with access to information about computer devices on both networks may be extremely difficult. In addition, for security purposes, most computer networks are designed as closed environments that limit access from computer devices outside the network. Thus, existing techniques for providing network information to devices outside the network typically require opening the network for public access, thereby compromising network security.

One such previously known technique is used in PrinterOn™ technology, by PrinterOn Corporation, Kitchener, Ontario, Canada. PrinterOn provides network-based printing solutions for printing over the Internet, but requires that a print network administrator manually configure a list of available printers in a directory on a public server. Unfortunately, however, PrinterOn has several disadvantages. First, the technology does not automatically map network users to printers on the same network, but instead requires use of a manual search engine to discover available printers. If the print network administrator modifies the print network but fails to update the directory on the public server, however, the search results may provide false results. Second, PrinterOn requires allowing external connections into the local network, which potentially compromises network security. Thus, PrinterOn does nothing to simplify network device discovery, and provides print services at the expense of network security.

In view of the foregoing, it would be desirable to provide systems, methods and apparatus for automatically providing information regarding network computer devices.

It further would be desirable to provide systems, methods and apparatus for providing information regarding network computer devices on a network without requiring intervention by a network administrator.

It additionally would be desirable to provide systems, methods and apparatus for providing information regarding network computer devices on a network without degrading network performance.

It also would be desirable to provide systems, methods and apparatus for providing information regarding network computer devices on multiple networks without compromising network security.

It moreover would be desirable to provide systems, methods and apparatus for providing information regarding network computer devices on multiple non-homogeneous networks.

SUMMARY

In view of the foregoing, it is an object of this invention to provide systems, methods and apparatus for automatically providing information regarding network computer devices.

It further is an object of this invention to provide systems, methods and apparatus for providing information regarding network computer devices on a network without requiring intervention by a network administrator.

It additionally is an object of this invention to provide systems, methods and apparatus for providing information regarding network computer devices on a network without degrading network performance.

It also is an object of this invention to provide systems, methods and apparatus for providing information regarding network computer devices on multiple networks without compromising network security.

It moreover is an object of this invention to provide systems, methods and apparatus for providing information regarding network computer devices on multiple non-homogeneous networks.

These and other objects of this invention are accomplished by providing systems, apparatus and methods for providing information access to network devices. A directory server is provided for registering identification information about a network device coupled to a first network. The network device may be one of a computer, personal digital assistant, pager, cellular telephone, handheld messaging device, facsimile machine, copier, printer, telephone, security camera, household appliance, vending machine, kiosk, digital camera or similar device. The first network may be a local area network, wide area network, private network of similar network. The first network and the directory server may be coupled to a second network, which may include a wide area network, public network, or the Internet. The identification information may include a network address of the first network device on the first network, or a network address of the first network on the second network. The directory server may receive and process requests for identification information about registered network devices. For example, the first network device may request identification information about a second network device coupled to the first network. The directory server may selectively reply to the requests based on status information of the first or second network devices.

The directory server also may register first identification information about a first network device coupled to a first network and second identification information about a second network device coupled to a third network. The first and second network devices each may be one of a computer, personal digital assistant, pager, cellular telephone, handheld messaging device, facsimile machine, copier, printer, telephone, security camera, household appliance, vending machine, kiosk, digital camera or similar device. The first and third networks each may be a local area network, wide area network, private network of similar network. The first and third networks and the directory server may be coupled to a second network, which may include a wide area network, public network, or the Internet. The first identification information may include a network address of the first network device on the first network, or a network address of the first network on the second network. The second identification information may include a network address of the second network device on the third network, or a network address of the third network on the second network. The directory server may receive and process requests for identification information about registered network devices. For example, the first network device may request identification information about the second network device. The directory server may selectively reply to the requests based on status information of the first or second network devices.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 4B is an alternative exemplary directory table in accordance with this invention;

FIG. 5 is an exemplary cross-map table in accordance with this invention;

FIG. 6 is another alternative exemplary directory table in accordance with this invention;

FIG. 8 is an alternative exemplary cross-map table in accordance with this invention;

FIG. 9 is another alternative exemplary directory table in accordance with this invention;

FIG. 11 is another alternative exemplary directory table in accordance with this invention;

FIG. 13 is another alternative exemplary directory table in accordance with this invention.

DETAILED DESCRIPTION

Figure 1:
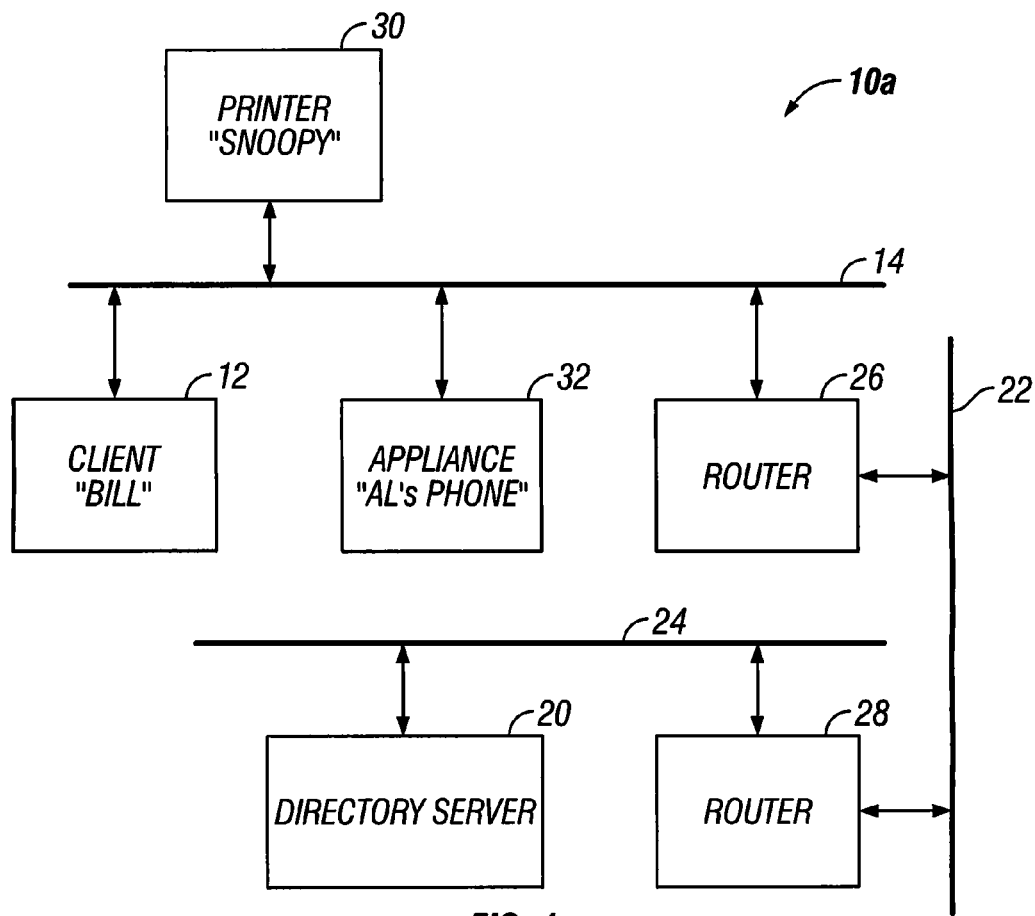
FIG. 1 is a block diagram of an exemplary system in accordance with this invention.

Referring to FIG. 1, an exemplary system in accordance with this invention is described. Exemplary system 10a includes client 12 coupled to first network 14, and directory server 20 coupled to third network 24. Client 12 may be a personal computer, desktop computer, laptop computer, handheld computer, personal digital assistant, cellular telephone, workstation, other similar device, or combination of such devices. Client 12 may have a name or other identifying information assigned for identification purposes. For example, client 12 may be named "Bill." Directory server 20 may be a personal computer, desktop computer, laptop computer, handheld computer, personal digital assistant, workstation, or other similar computer.

Printer 30 and network appliance 32 may also be coupled to first network 14. Printer 30 may be an inkjet printer, laser printer, wide format printer, dot matrix printer, facsimile machine, copy machine, or other similar print device. Printer 30 may have a name or other identifying information assigned for identification purposes. For example, printer 30 may be named "Snoopy." Network appliance 32 may be an Internet Protocol ("IP") telephone, security camera, pager, household appliance, vending machine, kiosk, digital camera, or other similar device that includes a network connection for coupling the device to a computer network. Network appliance 32 may have a name or other identifying information assigned for identification purposes. For example, network appliance 32 may be an IP telephone named "Al's phone."

Client 12, printer 30, IP telephone 32 and directory server 20 are collectively referred to herein as network devices. Client 12, printer 30, IP Phone 32 and directory server 20, may be located together, or may be located separately. For example, client 12 may be located in the United States, IP Phone 32 may be located in Brazil, printer 30 may be located in Germany and directory server 16 may be located in France. Client 12, printer 30, IP telephone 32 and directory server 20 may be commonly owned, or may be owned by different persons or entities. For example, client 12 and printer 30 may be owned by a first company, IP telephone 32 may be owned by an individual, and directory server 20 may be owned by a second company. Directory server 20 may be located at a public co-location facility, or at a private facility.

First network 14 may be any conventional computer network, such as a local area network, wide area network, wireless network, cellular network, satellite network or similar computer network. As used herein, a wide area network includes multiple distinct networks that are connected via a public network. Third network 24 may be any conventional computer network, such as a local area network, wide area network, wireless network, cellular network, satellite network or similar computer network. First network 14 and third network 24 may be separate networks, or may be the same network. First network 14 and third network 24 each may include multiple interconnected networks as is known in the art. First network 14 and third network 24 may be commonly operated, or may be separately operated. For example, first network 14 may be operated by a first network administrator or group of administrators and third network 24 may be operated by a second network administrator or group of administrators.

First network 14 and third network 24 each may be coupled to second network 22, which may be a wide area network, global network, the Internet, or similar network. Second network 22 may be a public or a private network, and may include multiple interconnected networks as is known in the art. First network 14 may be coupled to second network 22 via router 26, and third network 24 may be coupled to second network 22 via router 28. Router 26 may implement a first firewall that controls access to first network 14, and client 12, printer 30 and IP Phone 32 may be located within the first firewall. Directory server 20 may be located outside the first firewall.

Client 12, printer 30, and IP telephone 32 communicate over first network 14 and directory server 20 communicates over third network 24 in accordance with any conventional network communications protocol, such as TCP/IP, AppleTalk, IPX, or other similar network communications protocol that uses a network addressing scheme (e.g., IP addressing) to uniquely identify source and destination addresses of network devices and services. First network 14 and third network 24 may use the same network communications protocol, or may use different network communications protocols. For example, first network 14 may be an AppleTalk network, and third network 24 may be a TCP/IP network.

Client 12, printer 30, IP telephone 32 and router 26 each may have an "internal" IP address that uniquely identifies the devices on first network 14. For example, client 12, printer 30, IP telephone 32 and router 26 may have the following internal IP addresses on first network 14:

| Network Device | Internal IP Address |
|---|---|
| Client 12 | 192.168.1.100 |
| Printer 30 | 192.168.1.101 |
| IP Phone 32 | 192.168.1.102 |
| Router 26 | 192.168.1.1 |

Similarly, directory server 20 and router 28 each may have an internal IP address that uniquely identifies the devices on third network 24. For example, directory server and router 28 may have the following internal IP addresses on third network 24:

| Network Device | Internal IP Address |
|---|---|
| Directory Server 22 | 192.168.1.100 |
| Router 28 | 192.168.1.1 |

In addition, routers 26 and 28 each may have a "public" IP address on second network 22. For example, routers 26 and 28 may be assigned the following public IP addresses on second network 22:

| Network Device | Public IP Address |
|---|---|
| Router 26 | 67.113.234.12 |
| Router 28 | 87.102.27.2 |

Client 12, printer 30 and IP telephone 32 may communicate with one another on first network 14 via network messages that include a source address and a destination address. For example, client 12 may send a message to printer 30 that includes the client's internal IP address as the source address, and the printer's internal IP address as the destination address. Network devices on first network 14 may also communicate with network devices that are outside first network 14 using web-style messages via router 26. When sending a message from a network device within first network 14 to a network device outside first network 14, router 26 may change the source address of the message to a public IP addresses assigned to the router. In this regard, router 26 maps the internal IP address on first network 14 to a public IP address on second network 22. If the recipient network device outside first network 14 sends a reply to that public IP address, router 26 may change the destination address of the received message to the internal IP address mapped to that public IP address, and then forward the message on to the appropriate network device on first network 14.

Figure 2:
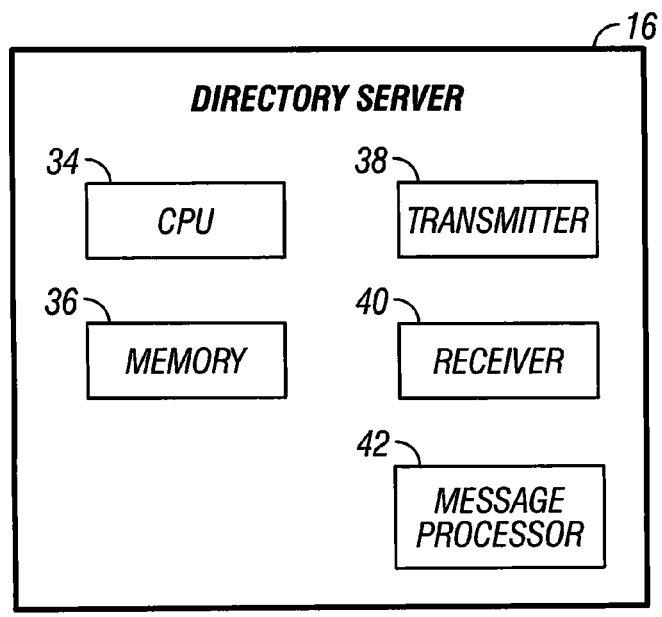
FIG. 2 is a block diagram of an exemplary directory server in accordance with this invention.

Directory server 20 is capable of registering and controlling access to information about network devices coupled to first network 14, and of receiving and processing requests for information about registered network devices. Referring now to FIG. 2, an exemplary directory server 20 in accordance with this invention is described. Directory server 20 includes central processing unit ("CPU") 34, memory 36, transmitter 38, receiver 40 and message processor 42. CPU 34 may be any conventional processor, such as a computer, microprocessor, application specific integrated circuit or other similar processor. Memory 36 may be any conventional memory, such as random access memory ("RAM"), floppy disk, hard disk, magnetic disk, optical disk or other similar read/write memory. Transmitter 38 and receiver 40 may be any conventional transmitter and receiver software and/or hardware for sending and receiving data packets over a communications network. Message processor 42 may be hardware, software or a combination of hardware and software that receives and processes messages from network devices, as described in more detail below. CPU 34, memory 36, transmitter 38, receiver 40 and message processor 42 may be included in a single device, or may be distributed amongst multiple devices.

Figures 3, 4A:
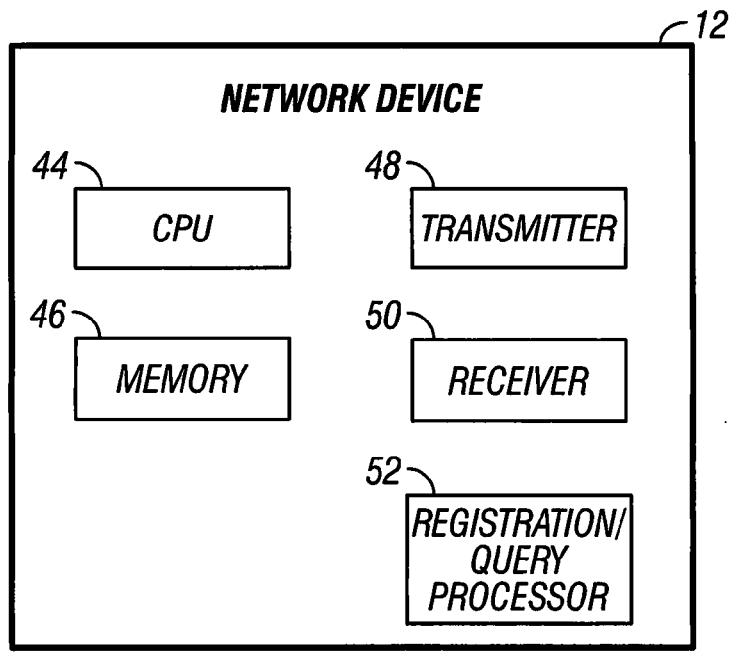
FIG. 3. is a block diagram of an exemplary network device in accordance with this invention.
FIG. 4A is an exemplary directory table in accordance with this invention.

Network devices in accordance with this invention, such as client 12, printer 30 and IP phone 32, are capable of sending registration information and requests for information about registered network devices to directory server 20. Referring now to FIG. 3, an exemplary network device in accordance with this invention is described. Network device 12 includes CPU 44, memory 46, transmitter 48, receiver 50 and registration/query processor 52. CPU 44 may be any conventional processor, such as a computer, microprocessor, application specific integrated circuit or other similar processor. Memory 46 may be any conventional memory, such as RAM, floppy disk, hard disk, magnetic disk, optical disk or other similar read/write memory. Transmitter 48 and receiver 50 may be any conventional transmitter and receiver software and/or hardware for sending and receiving data packets over a communications network. Registration/query processor 52 be hardware, software or a combination of hardware and software that transmits and receives identification and query messages to and from directory server 20, as described in more detail below. CPU 44, memory 46, transmitter 48, receiver 50 and registration/query processor 52 may be included in a single device, or may be distributed amongst multiple devices.

Referring again to FIGS. 1-3, network devices coupled to first network 14 may register with directory server 20 on third network 24 by communicating identifying information to the directory server. In particular, network devices connected to first network 14 may send identification messages to directory server 20. Specifically, the registration/query processor 52 of the network device formulates an identification message that includes the source address and device type of the network device, and may also include other identifying information regarding the device, such as internal address, email address, telephone number, device name or other information.

For example, registration/query processor 52 of printer 30 may send an identification message to directory server 20 via router 26 and second network 22. Prior to sending the identification message, router 26 may change the source address of the message to the public IP addresses assigned to the router (e.g., 67.113.234.12). Thus, the identification message may include the printer's source address (67.113.234.12), device type (e.g., printer), and device name (e.g., "Snoopy"). Directory server 20 receives the identification message, and message processor 42 parses the message to extract the source address and other identifying information regarding the sending device. Message processor 42 then registers printer 30 by saving the identifying information in a directory table in memory 36.

Referring now to FIG. 4A, an exemplary directory table for use with systems in accordance with this invention is described. Directory table 54a includes one or more entries, with each entry including identifying information regarding a registered network device. Exemplary directory table 54a includes the following identification information: source address, device type and device name. For example, directory table 54a indicates that printer "Snoopy" has a source address 67.113.234.12; client "Hillary" has a source address 82.24.117.8; client "Joe" has a source address 117.33.2.45; printer "Linus" has a source address 117.33.2.45; printer "Lucy' has a source address 117.33.2.45; client "Bill" has a source address 67.113.234.12; and IP Phone "A1's Phone" has a source address 67.113.234.12. Persons of ordinary skill in the art will understand that alternate or additional identifying information about each network device may be included in directory table 54a. For example, directory table 54a may include an email address, telephone number, user name or other identifying information in place of or in addition to the device name.

Referring again to FIGS. 1-4A, network devices on first network 14 may also request information from directory server 20 regarding registered network devices. For example, registration/query processor 52 of client 12 may send a query message to directory server 20. The query message includes the source address of the network device, and also includes a query regarding registered network devices coupled to first network 14. Receiver 40 of directory server 20 receives the query message, and message processor 42 then parses the message to extract the source address and the query from the message. Message processor 42 then processes the query to retrieve the requested information from directory table 54a, and transmitter 38 then sends a reply message to client 12 with the retrieved information.

For example, client 12 ("Bill") may send a query message to directory server 20 that includes the client's source address (e.g., 67.113.234.12) and a query (e.g., "What printers are on my network?"). Message processor 42 parses the query message to extract the source address and the query, and then processes the query to retrieve the requested information from directory table 54a. In particular, message processor 42 searches directory table 54a to identify any registered printers having a source address that matches the source address of client 12. For example, message processor 42 determines that printer "Snoopy" has a matching source address. Message processor 42 then formulates a reply message that includes the identified printer name, and transmitter 38 transmits the reply message to client 12. Registration/query processor 52 of client 12 receives the reply message, and provides the retrieved information to a user of the client device (e.g., via an audio, video or audio/video user interface). The user may then use the retrieved information to communicate with the printer using the printer's device name.

Similarly, client 12 ("Bill") may send a query message to directory server 20 that includes the client's source address and a query (e.g., "What IP telephones are on my network?"). Message processor 42 parses the query message to extract the source address and the query, and then processes the query to retrieve the requested information from directory table 54a. In particular, message processor 42 searches directory table 54a to identify any registered IP telephones having a source address that matches the source address of client 12. For example, message processor 42 determines that IP telephone "A1's Phone" has a matching source address. Message processor 42 then formulates a reply message that includes the identified telephone name, and transmitter 38 transmits the reply message to client 12. The user of client 12 may then use the retrieved information to communicate with the IP Phone using the telephone's device name.

Network devices in accordance with this invention may send identification messages that also include internal network address information. For example, registration/query processor 52 of printer 30 may send to directory server 20 an identification message that includes the printer's public IP address, internal IP address, device type, and device name. Directory server 20 receives the identification message, and message processor 42 parses the message to extract the address and other identifying information regarding the sending device. Message processor 42 then registers printer 30 by saving the identifying information in a directory table in memory 36.

Referring now to FIG. 4B, an alternative exemplary directory table for use with systems in accordance with this invention is described. Directory table 54b is similar to directory table 54a, but also includes an internal address of each device. For example, directory table 54b indicates that printer "Snoopy" has a source address 67.113.234.12 and an internal address 192.168.1.101; client "Hillary" has a source address 82.24.117.8, but has no internal address 10.10.99.32; client "Joe" has a source address 117.33.2.45 and has an internal address 208.210.1.47; printer "Linus" has a source address 117.33.2.45 and has an internal address 208.210.1.5; printer "Lucy' has a source address 117.33.2.45 and has an internal address 208.210.1.69; client "Bill" has a source address 67.113.234.12 and has an internal address 192.168.1.100; and IP Phone "A1's Phone" has a source address 67.113.234.12 and has an internal address 192.168.1.102.

Directory table 54b may be used to provide more specific information to network devices coupled to directory server 20. Referring again to FIGS. 1-3 and 4B, a network device connected to first network 14 may send directory server 20 a query message that includes the source address and internal address of the network device, and also includes a query regarding registered network devices coupled to first network 14. Receiver 40 of directory server 20 receives the query message, and message processor 42 then parses the message to extract the source address, internal address and the query from the message. Message processor 42 then processes the query to retrieve the requested information from directory table 54b, and transmitter 38 then sends a reply message to the network device with the retrieved information.

For example, client 12 ("Bill") may send a query message to directory server 20 that includes the client's source address (e.g., 67.113.234.12), internal address (e.g., 192.168.1.100) and a query (e.g., "What printers are on my network?"). Message processor 42 parses the query message to extract the source address, internal address and the query, and then processes the query to retrieve the requested information from directory table 54b. In particular, message processor 42 searches directory table 54b to identify any registered printers having a source address that matches the source address of client 12. For example, message processor 42 determines that printer "Snoopy" has a matching source address. Message processor 42 then formulates a reply message that includes the identified printer name and corresponding internal address, and transmitter 38 transmits the reply message to client 12. The user may then use the retrieved information to communicate with the printer using the printer's name and/or internal address.

Similarly, client 12 ("Bill") may send a query message to directory server 20 that includes the client's source address (e.g., 67.113.234.12), internal address (e.g., 192.168.1.100) and a query (e.g., "What IP telephones are on my network?"). Message processor 42 parses the query message to extract the source address, internal address and the query, and then processes the query to retrieve the requested information from directory table 54b. In particular, message processor 42 searches directory table 54b to identify any registered IP telephones having a source address that matches the source address of client 12. For example, message processor 42 determines that IP telephone "A1's Phone" has a matching source address. Message processor 42 then formulates a reply message that includes the identified telephone name and corresponding internal address, and transmitter 38 transmits the reply message to client 12. The user of client 12 may then use the retrieved information to communicate with the IP Phone using the telephone's name and/or internal address.

In the previous examples, router 26 has a single public IP address on second network 22. In an alternative exemplary embodiments in accordance with this invention, router 26 may be assigned multiple public IP addresses on second network 22. For example, router 26 may be assigned the following five public IP addresses on second network 22:

| Network Device | Public IP Address |
| --- | --- |
| Router 26 | 67.113.234.12 |
| Router 26 | 67.113.234.13 |
| Router 26 | 67.113.234.14 |
| Router 26 | 67.113.234.15 |
| Router 26 | 67.113.234.16 |

In this regard, router 26 is not limited to using a single public IP address, but instead may use any of its available public IP addresses for routing messages from network devices on first network 14 over second network 22. Thus, when a network device on first network 14 sends a message to a network device outside first network 14, router 26 may change the source address of the message to any one of the public IP addresses assigned to the router (e.g., the next available public IP address).

In such instances where multiple public addresses are used for communications from a single network, an administrator of directory server 20 may cross-map the various public addresses to indicate that multiple addresses constitute a single network for purposes of query processing. For example, the administrator may create a table in memory 36 that cross-maps source addresses. An exemplary cross-map table is illustrated in FIG. 5. Cross-map table 56a includes a list of source addresses and corresponding "equivalent" source addresses. Thus, source address 67.113.234.12 has equivalent source addresses 67.113.234.13, 67.113.234.14, 67.113.234.15 and 67.113.234.16, and source address 117.33.2.45 has equivalent source addresses 208.210.1.47 and 17.1.100.65.

Referring now to FIG. 6, another alternative exemplary directory table for use with systems in accordance with this invention is described. Directory table 54c includes identifying information regarding network devices coupled to networks that may use multiple public IP addresses for communications outside the network. Directory table 54c includes the source address, internal address, device type and device name. Thus, printer "Snoopy" has a source address 67.113.234.12 and an internal address 192.168.1.101; client "Hillary" has a source address 82.24.117.8, but has no internal address; client "Joe" has a source address 117.33.2.45 and has an internal address 208.210.1.47; printer "Linus" has a source address 4.3.116.57 and has an internal address 208.210.1.5; printer "Lucy" has a source address 17.1.100.65 and has an internal address 208.210.1.69; client "Bill" has a source address 67.113.234.13 and has an internal address 192.168.1.100; and IP Phone "A1's Phone" has a source address 67.113.234.14 and has an internal address 192.168.1.102.

If cross-map table 56a is used in conjunction with directory table 54c, message processor 42 may be used to process query messages regarding network devices listed in directory table 54c. For example, client 12 ("Bill") may send a query message to directory server 20 that includes the client's source address (e.g., 67.113.234.13), internal address (e.g., 192.168.1.100) and a query (e.g., "What printers are on my network?"). Message processor 42 parses the query message to extract the source address, internal address and the query, and then processes the query to retrieve the requested information from directory table 54c. In particular, message processor 42 searches directory table 54c to identify any registered printers having a source address or equivalent source address that matches the source address of client 12. In this example, message processor 42 determines that printer "Snoopy" has a source address (67.113.234.12) that is an equivalent source address to the source address of client 12. Message processor 42 then formulates a reply message that includes the printer name and corresponding internal address, and transmitter 38 transmits the reply message to client 12.

Similarly, client 12 ("Bill") may send a query message to directory server 20 that includes the client's source address (e.g., 67.113.234.13), internal address (e.g., 192.168.1.100) and a query (e.g., "What IP telephones are on my network?"). Message processor 42 parses the query message to extract the source address, internal address and the query, and then processes the query to retrieve the requested information from directory table 54c. In particular, message processor 42 searches directory table 54c to identify any registered IP telephones having a source address or equivalent source address that matches the source address of client 12. In this example, message processor 42 determines that IP telephone "A1's Phone" has a source address (67.113.234.14) that is an equivalent source address to the source address of client 12. Message processor 42 then formulates a reply message that includes the identified IP telephone name and corresponding internal address, and transmitter 38 transmits the reply message to client 12.

Figure 7:
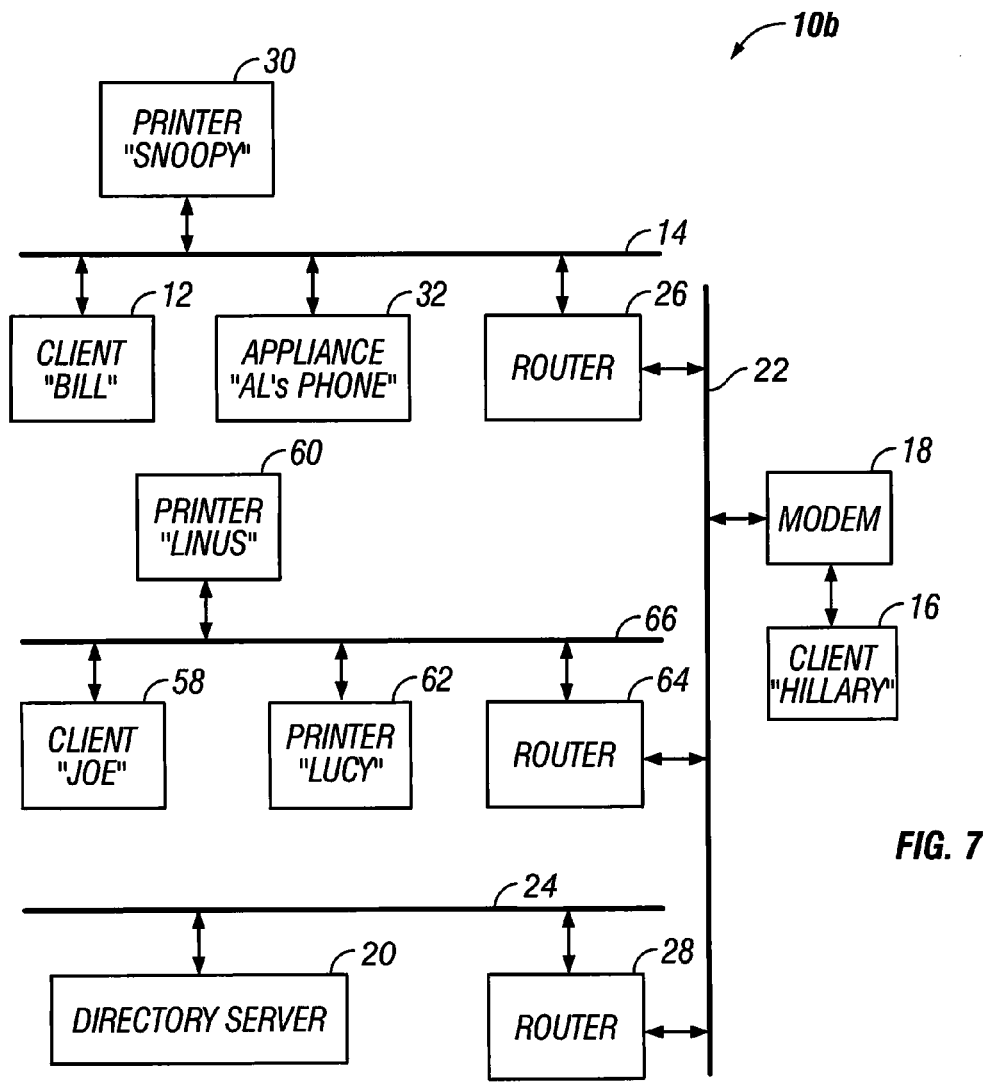
FIG. 7 is a block diagram of an alternative exemplary system in accordance with this invention.

Referring now to FIG. 7, an alternative exemplary system in accordance with this invention is described. System 10b includes the same elements as system 10a, but also includes client 16 coupled to second network 22 via modem 18, and client 58 and printers 60 and 62 coupled to fourth network 66. Clients 16 and 58 each may be a personal computer, desktop computer, laptop computer, handheld computer, personal digital assistant, cellular telephone, workstation, or other similar device, and each may have a name assigned for identification purposes. For example, client 16 may be named "Hillary," and client 58 may be named "Joe." Printers 60 and 62 each may be an inkjet printer, laser printer, wide format printer, dot matrix printer, facsimile machine, copy machine, or other similar print device, and each may have a name assigned for identification purposes. For example, printer 60 may be named "Linus," and printer 62 may be named "Lucy."

Fourth network 66 is coupled to second network 22 via router 64. Fourth network 66 may be any conventional computer network, such as a local area network, wide area network, wireless network, cellular network, satellite network or similar computer network. Fourth network 66 may include multiple interconnected networks as is known in the art. Modem 18 may be a dial-up modem, DSL modem, cable mode, or other similar modem device, and may have a public IP address on second network 22. For example, modem 18 may be assigned public IP address 82.24.117.8. Routers 26 and 64 each may be assigned one or more public IP addresses on second network 22. For example, router 26 may be assigned public IP addresses 67.113.234.12-6.113.234.16, and router 64 may be assigned public IP addresses 117.33.2.45, 4.3.116.157 and 17.1.100.65.

First network 14 and fourth network 66 may be two separate networks. Nevertheless, it may be desirable for network devices on each network to access information about network devices on both networks. For example, first network 14 and fourth network 66 may be networks that are operated by the same company, or may be operated by separate companies that nevertheless desire to allow shared access to information about network devices on both networks. Similarly, it may be desirable for client 16 to have access to information about network devices on fourth network 66. For example, client 16 may be a traveling user who requires information regarding network devices on second network 66. In accordance with this invention an administrator of directory server 20 may cross-map the public addresses of client 16, first network 14 and fourth network 66 for purposes of query processing. An exemplary cross-map table is illustrated in FIG. 8. Cross-map table 56b indicates that source address 67.113.234.12 has equivalent source addresses 67.113.234.13-67.113.234.16, 117.33.2.45, 4.3.116.157, and 17.1.100.65, and that source address 82.24.117.8. has equivalent source addresses 117.33.2.45, 4.3.116.157, and 17.1.100.65.

If cross-map table 56b is used in conjunction with directory table 54c of FIG. 6, message processor 42 may be used to process query messages regarding network devices listed in directory table 54c. For example, client 12 ("Bill") may send a query message to directory server 20 that includes the client's source address (e.g., 67.113.234.13), internal address (e.g., 192.168.1.100) and a query (e.g., "What printers are on my network?"). Message processor 42 parses the query message to extract the source address, internal address and the query, and then processes the query to retrieve the requested information from directory table 54c. In particular, message processor 42 searches directory table 54c to identify any registered printers having a source address or equivalent source address that matches the source address of client 12. In this example, message processor 42 determines that printers "Snoopy," "Linus" and "Lucy" have source addresses that are equivalent source addresses to the source address of client 12. Message processor 42 then formulates a reply message that includes the identified printer names and corresponding internal addresses, and transmitter 38 transmits the reply message to client 12.

Similarly, client 16 ("Hillary") may send a query message to directory server 20 that includes the client's source address (e.g., 82.24.117.8) and a query (e.g., "What printers are on my network?"). Message processor 42 parses the query message to extract the source address and the query, and then processes the query to retrieve the requested information from directory table 54c. In particular, message processor 42 searches directory table 54c to identify any registered printers having a source address or equivalent source address that matches the source address of client 16. In this example, message processor 42 determines that printers "Linus" and "Lucy" have source addresses that are equivalent source addresses to the source address of client 16. Message processor 42 then formulates a reply message that includes the identified printer names and corresponding internal addresses, and transmitter 38 transmits the reply message to client 16.

Referring now to FIG. 9, another alternative exemplary directory table for use with systems in accordance with this invention is described. Directory table 54d includes one or more entries, with each entry including identifying information regarding a network device that has transmitted an identification message to directory server 20. The identifying information includes access rights and characteristic information about each network device. The access rights and characteristic information may be included in identifying messages provided by each network device, or may be assigned by the administrator of directory server 20.

For example, directory table 54d indicates that "Snoopy" is a high-speed black-and-white printer that requires password authentication from other network devices; "Hillary" is a desktop computer that has access to information about all network printers, but no access to information about network IP phones; "Joe" is a personal digital assistant ("PDA") that has access to information about black-and-white network printers, but no access to information about network IP phones; "Linus" is a low-speed black-and-white printer that has no access restrictions; "Lucy' is a color printer that is available only to preferred network devices; "Bill" is a wireless laptop that has access to information about low-speed black-and-white network printers and network IP phones; and "Al's Phone" is a secure IP phone that has access to information about color network printers and network IP phones. Persons of ordinary skill in the art will understand that other information about each network device may be included in directory table 54d.

Referring again to FIGS. 2, and 7-9, message processor 42 may be used to process query messages regarding network devices listed in directory table 54d. For example, in response to receiving the query "What printers are on my network?" from client 12 ("Bill"), message processor 42 processes the query to retrieve the requested information from directory table 54d. In particular, message processor 42 retrieves any printer access rights associated with client 12 from directory table 54d (i.e., only low speed black- and white printers), and then searches the directory table to identify any registered printers that are within the access rights of client 12, and that have a source address or equivalent source address that matches the source address of client 12 (67.113.234.13). In this example, using cross-map table 56b, message processor 42 determines that "Linus" is a low-speed black-and-white printer that has a source address (4.3.116.57) that is an equivalent source address to the source address of client 12. Message processor 42 then formulates a reply message that includes the identified printer name and corresponding internal address, and transmitter 38 transmits the reply message to client 12.

Similarly, in response to receiving the query "What printers are on my network?" from client 58 ("Joe"), message processor 42 processes the query to retrieve the requested information from directory table 54d. In particular, message processor 42 retrieves any printer access rights associated with client 58 from directory table 54d (i.e., all black-and-white printers), and then searches the directory table to identify any registered printers that are within the access rights of client 58, and that have a source address or equivalent source address that matches the source address of client 58 (117.33.2.45). In this example, using cross-map table 56b, message processor 42 determines that "Snoopy" and "Linus" are black-and-white printers that have source addresses that are equivalent to the source address of client 58. However, Snoopy requires password access. Message processor 42 then prompts client 58 for an access password. If client 58 provides a correct password, message processor 42 formulates a reply message that includes the identified printer names and corresponding internal addresses of printers Snoopy and Linus, and transmitter 38 transmits the reply message to client 58. If client 58 fails to provide the correct password, message processor 42 may provide an error message, and then formulate a reply message that includes only the name and corresponding internal address of printer Linus, and transmitter 38 transmits the reply message to client 58.

Figure 10:
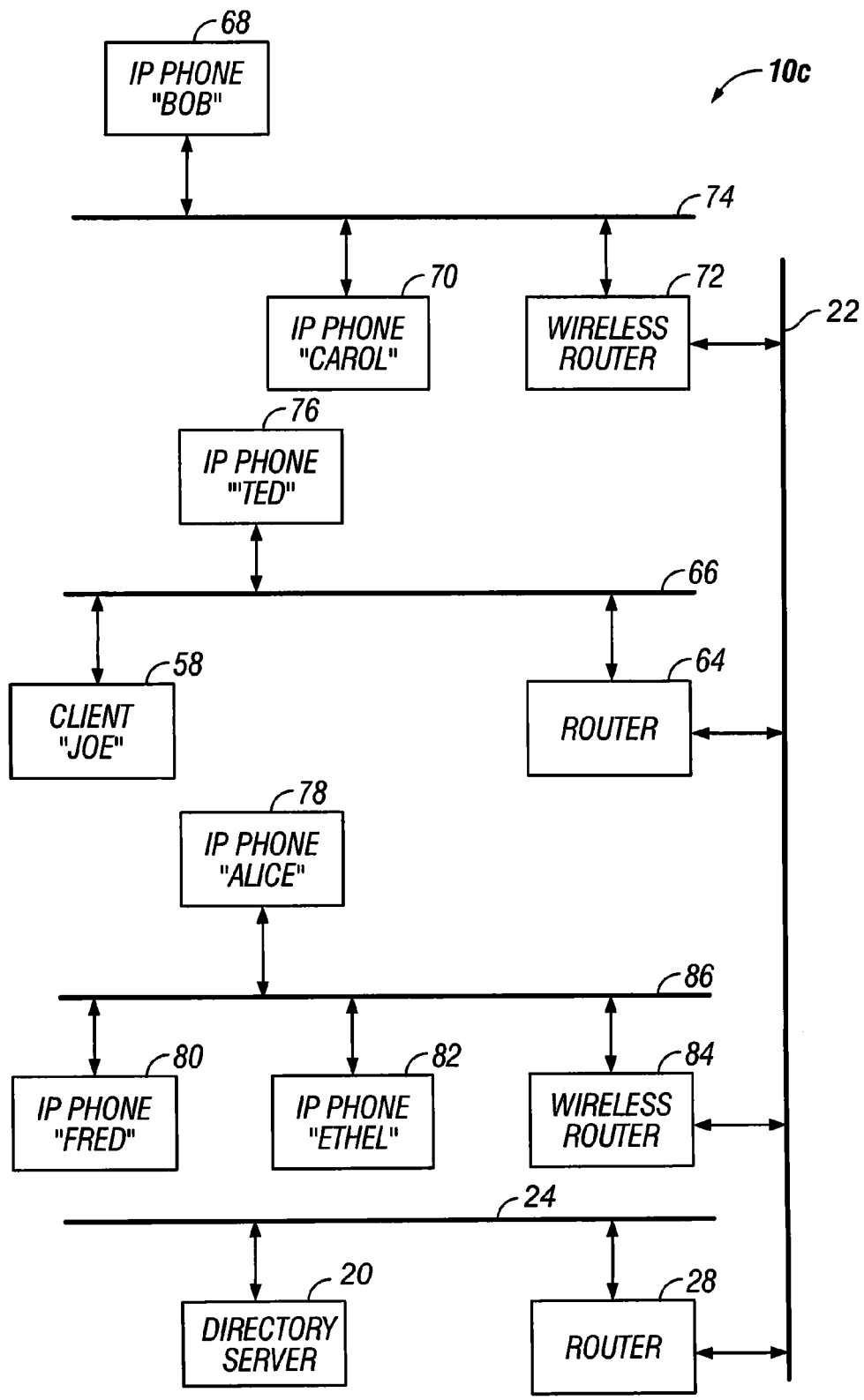
FIG. 10 is a block diagram of another alternative exemplary system in accordance with this invention.

Referring now to FIG. 10, another alternative exemplary system in accordance with this invention is described. System 10c includes IP telephones 68 ("Bob") and 70 ("Carol") coupled to fifth network 74, IP telephone 76 ("Ted") and client 58 ("Joe") coupled to fourth network 66, IP telephones 78 ("Alice"), 80 ("Fed") and 82 ("Ethel") coupled to sixth network 86. IP telephone 76 may be coupled to network 66 via a wired connection. Fifth and sixth networks 74 and 86 may be wireless networks, such as IEEE 802.11™ wireless local area networks, or other similar wireless networks. Fifth and sixth networks 74 and 86 may be the same type of wireless network, or may be two different types of wireless network, and each may include multiple interconnected networks as is known in the art. IP telephones 68 and 70 may be IP telephones that include wireless network circuitry for connecting to wireless network 74, and IP telephones 78, 80 and 82 may be IP telephones that include wireless network circuitry for connecting to wireless network 86. Fifth and sixth networks 74 and 86 may be coupled to second network 22 via wireless routers 72 and 84, respectively.

Referring now to FIG. 11, an exemplary directory table for use with system 10c is described. Directory table 54e includes one or more entries, with each entry including identifying information regarding a network device that has transmitted an identification message to directory server 20. In addition, directory table 54d includes information regarding a location of each network device. In particular, an administrator of directory server 20 may assign location information to each source address in directory table 54d. For example, source addresses 75.8.92.1, and 117.33.2.45 may indicate network devices located in "Building A," and source address 19.4.79.65 may indicate network devices located in "Building B." The administrator may also assign additional location information based on a device's internal IP address. For example, internal address 192.168.1.102 may indicate a device located on a second floor; internal address 192.168.1.103 may indicate a device located on a third floor; internal address 208.210.1.63 may indicate a device located in "Conference Room D;" and internal address 208.210.1.47 may indicate a device located in "Cubicle 1A238." Persons of ordinary skill in the art will understand that other information about each network device may be included in directory table 54*d*.

Referring again to FIGS. 2 and 10-11, message processor 42 may be used to process query messages regarding network devices listed in directory table 54*e*. For example, in response to receiving the query "What IP Phones are located on my network?" from IP Phone 68 ("Bob"), message processor 42 processes the query to retrieve the requested information from directory table 54*e*. In particular, message processor 42 searches the directory table to identify any registered IP Phones that have a source address or equivalent source address that matches the source address of IP Phone 68 (75.8.92.1). In this example, message processor 42 determines that IP Phone 70 "Carol" is an IP Phone that has a source address that has a matching source address. Message processor 42 then formulates a reply message that includes the identified IP Phone name and corresponding internal address, and transmitter 38 transmits the reply message to IP Phone 68.

After receiving a list of phones on the same network, IP Phone 68 may then send a message to directory server 16 that includes the query "Where is Carol?" Message processor 42 processes the query to retrieve the requested information from directory table 54*e*. In particular, message processor 42 searches the directory table to identify location information associated with Carol's source address and/or internal address. In this example, message processor 42 determines that Carol is located on the third floor of Building A. Message processor 42 then formulates a reply message that includes Carol's identified address, and transmitter 38 transmits the reply message to IP Phone 68.

Figure 12:
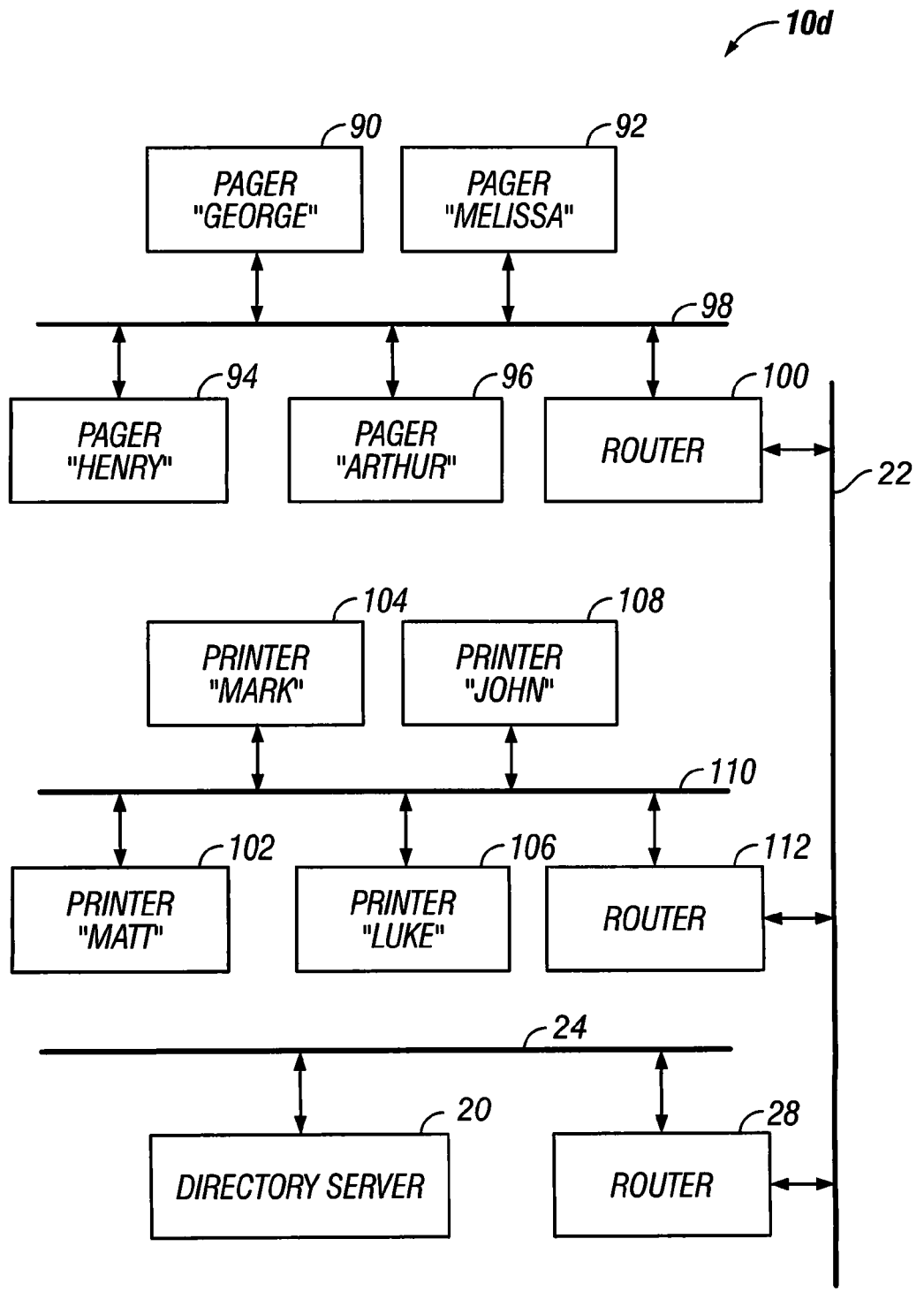
FIG. 12 is a block diagram of another alternative exemplary system in accordance with this invention.

Referring now to FIG. 12, another alternative exemplary system in accordance with this invention is described. System 10*d* includes pagers 90 ("George"), 92 ("Melissa"), 94 ("Henry") and 96 ("Arthur") coupled to seventh network 98, and printers 102 ("Matt"), 104 ("Mark"), 106 ("Luke") and 108 ("John") coupled to eighth network 110. Seventh network 98 may be a wireless pager network, or other similar wireless networks. Eighth network 110 may be any conventional computer network, such as a local area network, wide area network, wireless network, cellular network, satellite network or similar computer network. Seventh and eighth networks 98 and 110 each may include multiple interconnected networks as is known in the art. Seventh and eighth networks 98 and 110 may be commonly operated, or may be separately operated. For example, seventh network 98 may be operated by a printer repair company that provides service technicians at multiple locations, with each technician having a pager for receiving support calls. Eighth network 110 may be operated by a commercial printshop that has printers at multiple locations, with each printer occasionally requiring technical support. Seventh and eighth networks 98 and 110 may be coupled to second network 22 via wireless routers 100 and 112, respectively. Routers 100 and 112 may have public addresses 2.67.13.120 and 45.39.1.200 on second network 24, respectively.

Referring now to FIG. 13, an exemplary directory table for use with system 10*d* is described. Directory table 54*f* includes one or more entries, with each entry including identifying information regarding a network device that has transmitted an identification message to directory server 20. In particular, directory table 54*d* includes source address, device name, device type, and internal address or pager number. In this particular, example, pagers 92, 94, 96 and 98 have the same source address (2.67.13.120), and printers 102, 104, 106 and 108 have the same source address (45.39.1.200). Persons of ordinary skill in the art will understand that in other embodiments of this invention, one or more of pagers 92, 94, 96 and 98 may have a unique source address, and one or more of printers 102, 104, 106 and 108 may have a unique source address.

In addition, directory table 54*f* includes information regarding a location of each network device and support status or restrictions. For example, pager "George" is located in San Francisco, and provides support to any customer; pager "Melissa" is located in San Francisco, and provides support only to "premier" customers; pager "Henry" is a pager located in New York, and provides support to any customer; pager "Arthur" is located in the United States, and provide support only priority fee support; printer "Matt" is located in New York, but has no support; printer "Mark" is located in Dallas, and pays for support on a per-use basis; printer "Luke" is located in San Francisco, and is entitled to premier support; and printer "John" is located in San Francisco, and is entitled to "regular" support.

Referring again to FIG. 12, it may be desirable for printers 102-108 coupled to eighth network 110 to obtain technical support from service technicians using pagers 92-96 coupled to seventh network 98. Thus, an administrator of directory server 20 cross-map the source addresses of seventh network 98 and eighth network 110 so that network devices on each network may access information about network devices on both networks.

Indeed, referring again to FIGS. 2-3 and 12-13, message processor 42 may be used to process query messages regarding network devices listed in directory table 54*f*. For example, in response to receiving the query "Help! I need support!" from printer 106 ("Luke"), message processor 42 processes the query to retrieve support information from directory table 54*f*. In particular, message processor 42 searches the directory table to identify any registered pagers that have a source address or equivalent source address that matches the source address of printer 106. In this example, message processor 42 determines that pagers 92-96 each have matching source addresses. Message processor 42 may then formulate a reply message that includes the identified pager name and pager number, and transmitter 38 transmits the reply message to IP Phone 68.

Alternatively, message processor 42 may be configured to further match support requests from printers 102-108 based on location. For example, message processor 42 may retrieve printer John's location information from directory table 54*f*, and then try to find a pager having a geographically close location. In this example, message processor 42 may determine that pagers George and Melissa are both located in San Francisco. Message processor 42 may then formulate a reply message that includes the identified pager names and pager numbers, and transmitter 38 transmits the reply message to printer John.

Still alternatively, message processor 42 may be configured to further match and/or support status or support requests from printers 102-108 based on support restrictions and support status. For example, message processor 42 may retrieve printer John's support status information from directory table 54*f*, and then try to find a pager having a compatible support restriction. In this example, message processor 42 determines that John is entitled to premier support, and determines that pager Melissa provides support for premier customers. Message processor 42 may then formulate a reply message that includes the identified pager name and pager number, and transmitter 38 transmits the reply message to printer John.

The foregoing merely illustrates the principles of this invention, and various modifications can be made by persons of ordinary skill in the art without departing from the scope and spirit of this invention.

The invention claimed is:

1. A system for controlling access to a printing environment comprising:
   a directory server coupled to a first network via a first router, the directory server comprising:
   a memory; and
   a message processor configured to register identification information in a directory table in the memory;
   at least one client device coupled to a second network; and
   at least one printing device coupled to the first network via an additional router, wherein said additional router enforces at least one firewall, wherein the first network is configured inside the firewall, wherein the directory server is configured outside the firewall, wherein said at least one printing device is configured to print at least one file from said at least one client device only after receiving necessary configuration information, and wherein said first network and said second network operate using non-homogeneous communication protocol;
   wherein the directory server message processor is configured for registering identification information that at least partially comprises availability information and configuration information;
   wherein said at least one client device is configured to send a discrete request to the directory server, said discrete request comprising an availability inquiry about the printing-availability of said at least one printing device; and
   wherein the directory server message processor is configured for processing the discrete request and issuing a discrete reply message to the at least one client device, wherein the discrete reply message comprises configuration information for the at least one client device to configure the at least one printer to print files from the at least one client device.

2. The system of claim 1, wherein the at least one printing device is selected from among an inkjet printer, a laser printer, a wide format printer, and a dot matrix printer.

3. The system of claim 1, wherein the at least one client device comprises one of a computer, personal digital assistant, pager, cellular telephone, mobile device, handheld messaging device, facsimile machine, copier, printer, telephone, security camera, household appliance, vending machine, kiosk, digital camera, and Internet protocol telephone.

4. The system of claim 1, wherein the first network comprises a local area network.

5. The system of claim 1, wherein the first network comprises a plurality of interconnected networks.

6. The system of claim 1, wherein the identifying information comprises an address of the first network on the second network.

7. A method for controlling access to a printing environment comprising:
   a directory server coupled to a first network via a first router, the directory server comprising:
   a memory; and
   a message processor configured to register identification information in a directory table in the memory;
   at least one client device coupled to a second network; and
   at least one printing device coupled to the first network via an additional router, wherein said additional router enforces at least one firewall, wherein the first network is configured inside the firewall, wherein the directory server is configured outside the firewall, wherein said at least one printing device is configured to print at least one file from said at least one client device only after receiving necessary configuration information, and wherein said first network and said second network operate using non-homogeneous communication protocol;
   wherein the directory server message processor is configured for registering identification information that at least partially comprises availability information and configuration information;
   wherein said at least one client device is configured to send a discrete request to the directory server, said discrete request comprising an availability inquiry about the printing-availability of said at least one printing device; and
   wherein the directory server message processor is configured for processing the discrete request and issuing a discrete reply message to the at least one client device, wherein the discrete reply message comprises configuration information for the at least one client device to configure the at least one printer to print files from the at least one client device.

8. The method of claim 7, wherein the at least one printing device is selected from among an inkjet printer, a laser printer, a wide format printer, and a dot matrix printer.

9. The method of claim 7, wherein the at least one client device comprises one of a computer, personal digital assistant, pager, cellular telephone, mobile device, handheld messaging device, facsimile machine, copier, printer, telephone, security camera, household appliance, vending machine, kiosk, digital camera, and Internet protocol telephone.

10. The method of claim 7, wherein the first network comprises a local area network.

11. The method of claim 7, wherein the first network comprises a plurality of interconnected networks.

12. The method of claim 7, wherein the identifying information comprises an address of the first network on the second network.

* * * * *